May 15, 1928. J. P. NICHOLSON Re. 16,964

VEHICLE WASHING PIT

Original Filed July 24, 1926

Witness:
Stephen J. Pebra

Inventor:
Jacob P. Nicholson
By Frank L. Belknap
Atty.

Reissued May 15, 1928. Re. 16,964

UNITED STATES PATENT OFFICE.

JACOB P. NICHOLSON, OF CHICAGO, ILLINOIS.

VEHICLE WASHING PIT.

Original No. 1,633,280, dated June 21, 1927, Serial No. 124,598, filed July 24, 1926. Application for reissue filed March 21, 1928. Serial No. 263,489.

The present invention relates more particularly to a pit constructed for the efficient washing of the body and chassis of an automobile.

More specifically, the pit construction of the present invent on comprises spaced parallel oppositely disposed side walls, the inner surface of each wall projecting below the normal floor level and terminating in the floor of the pit. Interposed between said walls are spaced runways provided with curbs and extending in the same parallel direction as the side walls. The automob'le washing devices are preferably mounted on the side wall, the latter also functioning as a splash wall. The inside surfaces of the side walls may be provided with inwardly cut-away portions functioning to receive and partially conceal flood lights.

Among the advantages of the present invention may be set forth the ease with which the chassis of an automobile may be cleaned by bringing said chassis on substantially the direct line of vision of the workmen. This is accomplished by dropping the floor of the pit a considerable distance below the normal floor level. The curbs on the runways permit the car to be moved and rolled backward and forward over the pit during the cleaning operation without the necessity of auxiliary guidance or steering.

Figure 1:
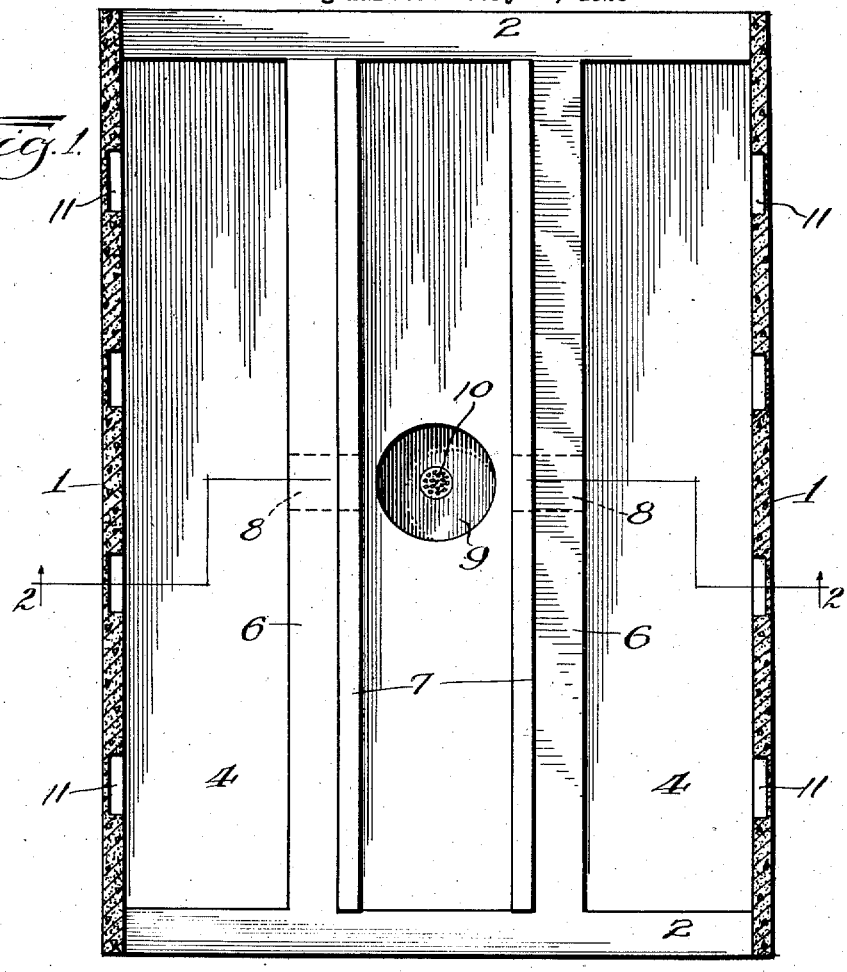
Figure 2:
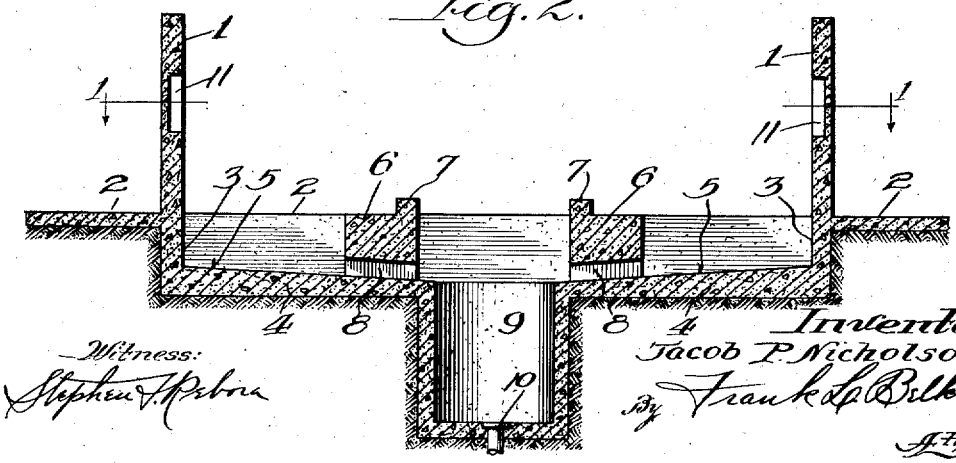

In the drawings, Fig. 1 is a top plan view, partly in section, the section being taken on line 1—1 of Fig. 2. Fig. 2 is a cross-sectional view taken on line 2—2 of Fig. 1.

Referring more in detail to the drawings, 1 designates two spaced oppositely disposed parallel side walls which project above the normal level 2 of the floor immediately adjacent thereto. The inside surfaces of the walls 1 project below the normal floor level 2, as shown at 3, terminating in the floor of the pit, shown at 4. The floor of the pit has been dropped a considerable distance below the normal floor level, for instance, between sixteen and twenty-four inches. The pit floor preferably slopes downwardly toward the center from each side wall, as shown at 5, for the purpose of directing the sewage toward an outlet drain, as will be hereinafter explained.

Interposed between the side walls 1 and extending in the same parallel direction relative to the side walls are a pair of spaced runways or piers 6, provided on their upper surface with outwardly projecting curbs 7, 7. The upper surface of each pier 6 is preferably in substantially the same horizontal plane as the normal floor level 2, in order that the car to be cleaned may be moved from the floor on to the runways and rolled from the runway to the floor with a minimum of effort.

As a feature of the invention, the base of each runway 6 is provided with apertures 8, 8, functioning as outlets, to permit the cleaning materials, d'rt, grease and the like, to flow inwardly along the sloping floor 5 of the pit and to be collected in the catchbasin 9 and directed to sewage through the outlet drain 10.

The inside surfaces of each wall may be provided with the inwardly cut-away portions 11, functioning as sockets for receiving and partially concealing flood lights.

It will be apparent that the pit construction of the present invention has been carefully designed to efficiently clean and wash all outside parts of an automobile, including the chassis. By dropping the floor of the pit, the chassis is brought on substantially a direct l'ne of vision with the workmen. By affording facilities for a flood light system, the night work can be performed with the same efficiency as can be obtained with natural light.

The pit is designed to accommodate two to ten workmen, according to the number of clean'ng mechanisms, and permits the cars to be easily moved backward and forward over the pit without the necessity of a person driving or guiding the car.

In use and operation, the pit construction of the present invention functions very efficiently, permitt'ng economy in labor and excellent results.

The entire construction is adapted to be constructed of concrete; but it is understood that other materials may be employed.

I claim as my invention:

1. A vehicle washing pit comprising spaced opposite walls projecting above the normal floor level, spaced vehicle runways parallel with and interposed between said walls, the upper surfaces of the runways lying in substantially the same plane as the normal level of the floor immediately adjacent thereto, a curb on the upper edge of each runway, the inside surface of each wall projecting below the normal floor level and terminating in the pit floor, and a drain communicating with the pit floor.

2. A vehicle washing pit comprising spaced opposite walls projecting above the normal floor level, spaced vehicle runways parallel with and interposed between said walls, the upper surfaces of the runways lying in substantially the same plane as the normal level of the floor immediately adjacent thereto, a curb on the upper edge of each runway, the inside surface of each wall projecting below the normal floor level and terminating in the pit floor, the pit floor sloping downwardly from each wall toward the center to direct the materials to be drained through apertures in the base of the runways communicating with an outlet drain.

3. A vehicle washing pit comprising spaced opposite walls projecting above the normal floor level, spaced vehicle runways parallel with and interposed between said walls, the upper surfaces of the runways lying in substantially the same plane as the normal level of the floor immediately adjacent thereto, a curb on the upper edge of each runway, the inside surface of each wall projecting below the normal floor level and terminating in the pit floor, said side walls being provided with spaced inwardly cutaway portions adapted to receive and partially conceal lights.

4. A vehicle washing pit comprising spaced opposite walls projecting above the normal floor level, spaced vehicle runways parallel with and interposed between said walls, the upper surfaces of the runways lying in substantially the same plane as the normal level of the floor immediately adjacent thereto, a curb on the upper edge of each runway, the inside surface of each wall projecting below the normal floor level and terminating in the pit floor, and a drain communicating with the pit floor, each runway being spaced from an adjacent side wall a sufficient distance to permit operators to freely move about while standing on the pit floor.

5. A vehicle washing pit comprising in combination spaced opposite walls projecting above the normal floor level, spaced vehicle runways substantially parallel with and interposed between said walls, each runway being spaced a considerable distance from its adjacent wall, the upper surfaces of said runways lying in substantially the same plane as the normal level of the floor immediately adjacent thereto, a curb on the upper surface of each runway, walls exterior of the runways whose inside surfaces project below the normal floor level and terminate in a floor to form a pit.

6. A vehicle washing pit comprising in combination spaced opposite walls projecting below the normal floor level and terminating in a floor to form a pit, a drain communicating with said floor, spaced vehicle runways substantially parallel with and interposed between said walls, the upper surfaces of the runways lying in substantially the same plane as the normal level of the floor immediately adjacent thereto, a curb on the upper edge of each runway, and walls projecting above the normal floor level outside of and spaced from said runways, each runway being spaced from an adjacent side wall a sufficient distance to permit operators to freely move about while standing on the pit floor.

7. A vehicle washing pit comprising in combination spaced opposite walls projecting below the normal floor level and terminating in a floor to form a pit, a drain communicating with said floor, spaced vehicle runways substantially parallel with and interposed between said walls, the upper surfaces of the runways lying in substantially the same plane as the normal level of the floor immediately adjacent thereto, a curb on the upper edge of each runway, each runway being spaced from an adjacent side wall a sufficient distance to permit operators to freely move about while standing on the pit floor.

JACOB P. NICHOLSON.